(12) United States Patent
Nakamura et al.

(10) Patent No.: US 11,719,599 B2
(45) Date of Patent: Aug. 8, 2023

(54) OPTICAL FIBER TEST METHOD AND OPTICAL FIBER TEST DEVICE

(71) Applicant: NIPPON TELEGRAPH AND TELEPHONE CORPORATION, Tokyo (JP)

(72) Inventors: Atsushi Nakamura, Musashino (JP); Tomokazu Oda, Musashino (JP); Daisuke Iida, Musashino (JP); Hiroyuki Oshida, Musashino (JP); Yoshifumi Wakisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/762,185

(22) PCT Filed: Oct. 10, 2019

(86) PCT No.: PCT/JP2019/039997
§ 371 (c)(1),
(2) Date: Mar. 21, 2022

(87) PCT Pub. No.: WO2021/070319
PCT Pub. Date: Apr. 15, 2021

(65) Prior Publication Data
US 2022/0381645 A1    Dec. 1, 2022

(51) Int. Cl.
*G01M 11/00* (2006.01)
(52) U.S. Cl.
CPC .................................. *G01M 11/39* (2013.01)

(58) Field of Classification Search
CPC ............... G01M 11/39; G01M 11/319; G01M 11/3127; G01M 11/3172; G01M 11/083;
(Continued)

(56) References Cited

U.S. PATENT DOCUMENTS 10,026,686 B2 * 7/2018 Bou-Ghazale ...... H01L 27/0733
11,385,082 B2 * 7/2022 Takahashi .............. G01D 5/353
(Continued)

OTHER PUBLICATIONS

T. Oda et al., "Modal attenuation measurement in spliced few mode fibre based on inter-modal Brillouin gain analysis", in Proceedings of the 44th ECOC, Paper We2.7, 2018.
(Continued)

*Primary Examiner* — Hoa Q Pham
(74) *Attorney, Agent, or Firm* — Harness, Dickey & Pierce, P.L.C.

(57) ABSTRACT

This disclosure describes inputting pulsated pump light in a fundamental mode or a first higher-order mode into one end of an optical fiber under test constructed by connecting two optical fibers in series; inputting probe light having an optical frequency difference within a Brillouin frequency shift range with respect to the pump light into the other end of the optical fiber under test in the fundamental mode or the first higher-order mode; measuring a Brillouin gain distribution related to a distance of transmitted light intensity of probe light output from the one end into which the pump light was input; and calculating each inter-modal coupling efficiency at the connection point of the optical fiber under test.

9 Claims, 3 Drawing Sheets

(58) Field of Classification Search
CPC ... G01M 11/02; G01D 5/353; G01D 5/35364; G01D 5/35358; G01K 11/322; G01B 11/168; H04B 10/1071
USPC .................................. 356/73.1; 385/11, 12
See application file for complete search history.

(56) References Cited

U.S. PATENT DOCUMENTS

| | | | |
|---|---|---|---|
| 11,402,295 B2* | 8/2022 | Oda | G01M 11/39 |
| 2022/0163355 A1* | 5/2022 | Ryu | G01D 5/35364 |

OTHER PUBLICATIONS

A. Nakamura et al., "Effective mode field diameter for LP11 mode and its measurement technique", IEEE Photon. Technol. Lett., vol. 28, No. 22, pp. 2553-2556, 2016.

H. Takahashi et al., "Rayleigh-based OTDR with dynamic modal crosstalk suppression", Opt. Express, vol. 27, No. 2, pp. 783-791, 2019.

A. Nakamura et al., "A method for estimating loss and crosstalk at a splice point in two-mode fibers from OTDR waveforms", in Proceedings of the 5th International Symposium on EXAT, P-01, 2019.

* cited by examiner

OPTICAL FIBER TEST METHOD AND OPTICAL FIBER TEST DEVICE

CROSS-REFERENCE TO RELATED APPLICATIONS

This application is a 371 U.S. National Phase of International Application No. PCT/JP2019/039997, filed on Oct. 10, 2019. The entire disclosures of the above applications are incorporated herein by reference.

TECHNICAL FIELD

The present disclosure relates to a test method and a test device for measuring loss for each mode and inter-modal crosstalk in a few-mode optical fiber.

BACKGROUND ART

With the increase in large-capacity contents represented by moving images and games and the proliferation of smartphones, amounts of traffic in optical fiber networks are increasing year after year. On the other hand, single-mode fibers presently used as transmission media are approaching their limits in terms of transmission capacity. As a technique for accommodating future increases in traffic, mode multiplex transmission using few-mode fibers is attracting attention. In the present technique, mode-dependent loss and inter-modal crosstalk that occur at a connection point of a few-mode fiber are factors that limit transmission capacity. Therefore, when constructing a transmission path by connecting a plurality of few-mode fibers, a technique for testing whether or not mode-dependent loss and inter-modal crosstalk that occur at a connection point are appropriate values is important.

An example of an optical fiber test method is Brillouin gain analysis (Brillouin Optical Time Domain Analysis, hereinafter BOTDA) BOTDA involves inputting pulse light as pump light into one end of a fiber under test (hereinafter referred to as FUT) and inputting continuous light (or pulse light) as probe light into another end. In this case, by setting optical frequencies (wavelengths) of the pump light and the probe light to values within a Brillouin frequency shift range, the probe light is amplified or attenuated via stimulated Brillouin scattering when the pump light and the probe light collide with each other (hereinafter, a case where the probe light is amplified will be described as an example). A loss distribution and the like in the optical fiber can be acquired from a time-domain response waveform (a Brillouin gain distribution) of intensity of the amplified probe light.

NPL 1 discloses a method using Brillouin gain analysis as a method of testing a loss for each mode that occurs at a connection point of a few-mode fiber. In the method, an optical frequency difference $\Delta v$ between pump light and probe light is controlled so that a Brillouin gain only occurs when optical modes of pump light and probe light combine in a specific manner and a Brillouin gain distribution is measured. In other words, the optical frequency difference $\Delta v$ between the pump light and the probe light is set to a Brillouin frequency shift amount between desired modes and a Brillouin gain distribution is measured. A loss for each mode is acquired by subjecting the obtained Brillouin gain distribution to numerical processing.

CITATION LIST

Patent Literature

[NPL 1] T. Oda et al., "Modal attenuation measurement in spliced few mode fibre based on inter-modal Brillouin gain analysis", in Proceedings of the 44th ECOC, Paper We2.7, 2018.
[NPL 2] A. Nakamura et al., "Effective mode field diameter for LP11 mode and its measurement technique", IEEE Photon. Technol. Lett., vol. 28, no. 22, pp. 2553-2556, 2016.
[NPL 3] H. Takahashi et al., "Rayleigh-based OTDR with dynamic modal crosstalk supression", Opt. Express, vol. 27, no. 2, pp. 783-791, 2019.
[NPL 4] A. Nakamura et al., "A method for estimating loss and crosstalk at a splice point in two-mode fibers from OTDR waveforms", in Proceedings of the 5th International Symposium on EXAT, P-01, 2019.

SUMMARY OF THE INVENTION

Technical Problem

However, depending on an optical fiber to be measured, there may not be an optical frequency difference at which a Brillouin gain only occurs with a specific combination. In other words, there may be cases where a Brillouin gain that is too large to ignore occurs in a combination other than the desired combination. Accordingly, there is a problem in that an error occurs in a loss measured by the method described in NPL 1.

The present invention has been made in consideration of the circumstances described above, and an object thereof is to provide an optical fiber test method and an optical fiber test device capable of eliminating the error factor described above and acquiring each inter-modal coupling efficiency at a connection point between few-mode optical fibers.

Means for Solving the Problem

In order to achieve the object described above, the optical fiber test method and the optical fiber test device according to the present disclosure apply numerical processing to transmittance of a connection point that occurs in a Brillouin gain distribution to calculate a loss and crosstalk for each desired mode.

The optical fiber test method according to the present disclosure includes performing:
a Brillouin gain coefficient acquisition procedure of acquiring a Brillouin gain coefficient that is unique to an optical fiber under test;
a pump light pulse input procedure of pulsating pump light of an optical frequency that enables the pump light to propagate both as fundamental mode light and as first higher-order mode light and inputting the pulsated pump light into one end of the optical fiber under test constructed by connecting two optical fibers in series in either a fundamental mode or a first higher-order mode;
a probe light input procedure of inputting probe light having an optical frequency shifted by a given frequency $v$ within a Brillouin frequency shift range with respect to the optical frequency of the pump light into the other end of the optical fiber under test in either a fundamental mode or a first higher-order mode;
a measurement procedure of measuring a Brillouin gain distribution related to a distance from the one end into which the pump light was input based on transmitted light intensity of the probe light output from an end surface into which the pump light was input;

a transmittance acquisition procedure of acquiring a transmittance of the probe light at a connection point of the optical fiber under test by using the Brillouin gain distribution measured in the measurement procedure; and a calculation procedure of substituting the acquired Brillouin gain coefficient and the acquired transmittance into a first mathematical expression representing a transmittance at the connection point that occurs in a Brillouin gain distribution in a fundamental mode and a second mathematical expression representing a transmittance at the connection point that occurs in a Brillouin gain distribution in a first higher-order mode according to each mode and simultaneously setting the first and second mathematical expressions to calculate at least one of a coupling efficiency between the fundamental modes, a coupling efficiency between the fundamental and first higher-order modes, or a coupling efficiency between the first higher-order modes.

The optical fiber test method according to the present disclosure includes performing:

a Brillouin gain coefficient acquisition procedure of acquiring a Brillouin gain coefficient that is unique to an optical fiber under test;

a pump light pulse input procedure of pulsating pump light of an optical frequency that enables the pump light to propagate both as fundamental mode light and as first higher-order mode light and inputting the pulsated pump light into one end of the optical fiber under test constructed by connecting two optical fibers in series in either a fundamental mode or a first higher-order mode;

a probe light input procedure of inputting probe light having an optical frequency shifted by a given frequency ν within a Brillouin frequency shift range with respect to the optical frequency of the pump light into the other end of the optical fiber under test in either a fundamental mode or a first higher-order mode;

a measurement procedure of measuring a Brillouin gain distribution related to a distance from the one end into which the pump light was input based on transmitted light intensity of the probe light output from an end surface into which the pump light was input;

a transmittance acquisition procedure of acquiring a transmittance of the probe light at a connection point of the optical fiber under test by using the Brillouin gain distribution measured in the measurement procedure; and a calculation procedure of executing each of the procedures described above using two frequency differences, with respect to each of the frequency differences, substituting the acquired Brillouin gain coefficient and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and simultaneously setting the first or second mathematical expressions to calculate at least one of a coupling efficiency between the fundamental modes, a coupling efficiency between the fundamental and first higher-order modes, or a coupling efficiency between the first higher-order modes.

The optical fiber test method according to the present disclosure includes performing:

a Brillouin gain coefficient acquisition procedure of acquiring a Brillouin gain coefficient that is unique to an optical fiber under test;

a pump light pulse input procedure of pulsating pump light of an optical frequency that enables the pump light to propagate both as fundamental mode light and as first higher-order mode light and inputting the pulsated pump light into one end of the optical fiber under test constructed by connecting two optical fibers in series in either a fundamental mode or a first higher-order mode;

a probe light input procedure of inputting probe light having an optical frequency shifted by a given frequency ν within a Brillouin frequency shift range with respect to the optical frequency of the pump light into the other end of the optical fiber under test in either a fundamental mode or a first higher-order mode;

a measurement procedure of measuring a Brillouin gain distribution related to a distance from the one end into which the pump light was input based on transmitted light intensity of the probe light output from an end surface into which the pump light was input;

a transmittance acquisition procedure of acquiring a transmittance of the probe light at a connection point of the optical fiber under test by using the Brillouin gain distribution measured in the measurement procedure; and a calculation procedure of substituting the acquired Brillouin gain coefficient and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and further substituting a third mathematical expression obtained by individually approximating an electric field distribution in a fundamental mode or a first higher-order mode in the optical fibers in a mathematical expression for obtaining each inter-modal coupling efficiency at the connection point of the optical fibers based on an electric field distribution of each mode in the optical fibers and an axial deviation amount at the connection point by a Gaussian function and an Hermitian Gaussian function to calculate at least one of a coupling efficiency between the fundamental modes, a coupling efficiency between the fundamental and first higher-order modes, or a coupling efficiency between the first higher-order modes.

The optical fiber test device according to the present disclosure includes:

pump light pulse input means which pulsates pump light of an optical frequency that enables the pump light to propagate both as fundamental mode light and as first higher-order mode light and inputs the pulsated pump light into one end of an optical fiber under test constructed by connecting two optical fibers in series in either a fundamental mode or a first higher-order mode;

probe light input means which inputs probe light having an optical frequency shifted by a given frequency ν within a Brillouin frequency shift range with respect to the optical frequency of the pump light into the other end of the optical fiber under test in either a fundamental mode or a first higher-order mode;

measurement means which measures a Brillouin gain distribution related to a distance from the one end into which the pump light was input based on transmitted light intensity of the probe light output from an end surface into which the pump light was input;

transmittance acquisition means which acquires a transmittance of the probe light at a connection point of the optical fiber under test by using the Brillouin gain distribution measured by the measurement means; and calculation means which substitutes a Brillouin gain coefficient unique to the optical fiber under test and the acquired transmittance into a first mathematical expression representing a transmittance at the connection point that occurs in a Brillouin gain distribution in a fundamental mode and a second mathematical expression representing a transmittance at the connection point that occurs in a Brillouin gain distribution in a first higher-order mode according to each mode and which simultaneously sets the first and second mathematical expressions to calculate at least one of a coupling efficiency between the fundamental modes, a coupling efficiency between the fundamental and first higher-order modes, or a coupling efficiency between the first higher-order modes.

The optical fiber test device according to the present disclosure includes:

pump light pulse input means which pulsates pump light of an optical frequency that enables the pump light to propagate both as fundamental mode light and as first higher-order mode light and inputs the pulsated pump light into one end of an optical fiber under test constructed by connecting two optical fibers in series in either a fundamental mode or a first higher-order mode;

probe light input means which inputs probe light having an optical frequency shifted by a given frequency ν within a Brillouin frequency shift range with respect to the optical frequency of the pump light into the other end of the optical fiber under test in either a fundamental mode or a first higher-order mode;

measurement means which measures a Brillouin gain distribution related to a distance from the one end into which the pump light was input based on transmitted light intensity of the probe light output from an end surface into which the pump light was input;

transmittance acquisition means which acquires a transmittance of the probe light at a connection point of the optical fiber under test by using the Brillouin gain distribution measured by the measurement means; and calculation means which, with respect to two different frequency differences, substitutes a Brillouin gain coefficient unique to the optical fiber under test and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and which simultaneously sets the first or second mathematical expressions to calculate at least one of a coupling efficiency between the fundamental modes, a coupling efficiency between the fundamental and first higher-order modes, or a coupling efficiency between the first higher-order modes.

The optical fiber test device according to the present disclosure includes:

pump light pulse input means which pulsates pump light of an optical frequency that enables the pump light to propagate both as fundamental mode light and as first higher-order mode light and inputs the pulsated pump light into one end of an optical fiber under test constructed by connecting two optical fibers in series in either a fundamental mode or a first higher-order mode;

probe light input means which inputs probe light having an optical frequency shifted by a given frequency ν within a Brillouin frequency shift range with respect to the optical frequency of the pump light into the other end of the optical fiber under test in either a fundamental mode or a first higher-order mode;

a measurement means which measures a Brillouin gain distribution related to a distance from the one end into which the pump light was input based on transmitted light intensity of the probe light output from an end surface into which the pump light was input;

transmittance acquisition means which acquires a transmittance of the probe light at a connection point of the optical fiber under test by using the Brillouin gain distribution measured by the measurement means; and calculation means which substitutes a Brillouin gain coefficient unique to the optical fiber under test and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and which further substitutes a third mathematical expression obtained by individually approximating an electric field distribution in a fundamental mode or a first higher-order mode in the optical fibers in a mathematical expression for obtaining each inter-modal coupling efficiency at the connection point of the optical fibers based on an electric field distribution of each mode in the optical fibers and an axial deviation amount at the connection point by a Gaussian function and an Hermitian Gaussian function to calculate at least one of a coupling efficiency between the fundamental modes, a coupling efficiency between the fundamental and first higher-order modes, or a coupling efficiency between the first higher-order modes.

Effects of the Invention

The present disclosure enables each inter-modal coupling efficiency at a connection point between few-mode fibers to be accurately acquired.

DESCRIPTION OF EMBODIMENTS

Hereinafter, an embodiment of the present invention will be described with reference to the accompanying drawings. It is to be understood that the embodiment described below is an example of the present invention and that the present invention is not limited to the embodiment described below. It is also to be understood that constituent elements with a same reference sign in the present specification and in the drawings represent the same constituent element.

Figure 1:
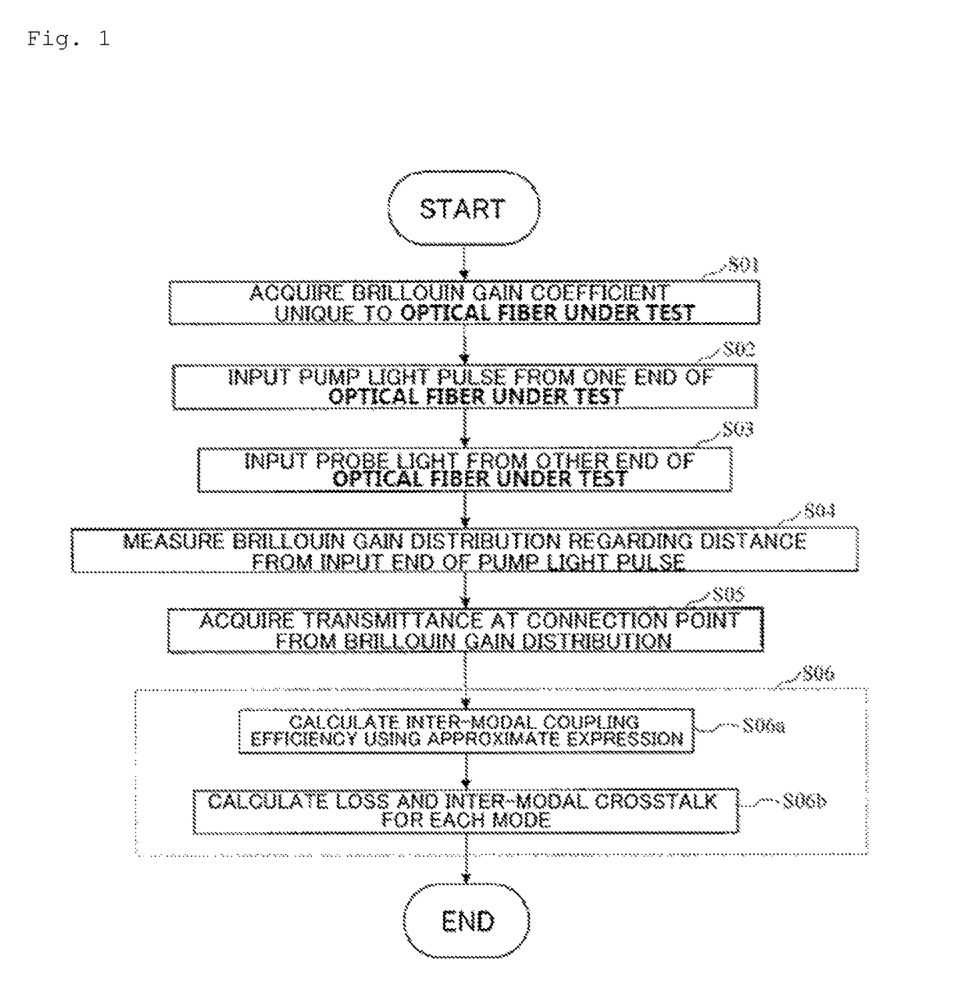
FIG. 1 is a diagram for describing an optical fiber test method according to the present invention.

FIG. 1 is a process chart for describing an optical fiber test method according to the present embodiment. The present optical fiber test method includes performing:

a Brillouin gain coefficient acquisition procedure S01 of acquiring a Brillouin gain coefficient that is unique to an optical fiber under test;

a pump light pulse input procedure S02 of pulsating pump light of an optical frequency (wavelength) that enables the pump light to propagate both as fundamental mode light and as first higher-order mode light and inputting the pulsated pump light into one end of the optical fiber under test constructed by connecting two optical fibers in series in either a fundamental mode or a first higher-order mode;

a probe light input procedure S03 of inputting probe light having an optical frequency shifted by a given frequency ν within a Brillouin frequency shift range with respect to the optical frequency of the pump light into the other end of the optical fiber under test in either a fundamental mode or a first higher-order mode;

a measurement procedure S04 of measuring a Brillouin gain distribution related to a distance from the one end into which the pump light was input based on transmitted light intensity of the probe light output from an end surface into which the pump light was input;

a transmittance acquisition procedure S05 of acquiring a transmittance at a connection point of the optical fiber under test by using the Brillouin gain distribution measured in the measurement procedure S04; and a calculation procedure S06 of substituting in the Brillouin gain coefficient acquisition procedure S01 and the transmittance acquired in the transmittance acquisition procedure S05 into expression (13) to calculate a value ($d^2/w^2$) and substituting the value into expression (10) to expression (12) or expression (14) to expression (19) to calculate a coupling efficiency $\eta_{01\text{-}01}$ between the fundamental modes, a coupling efficiency $\eta_{01\text{-}11}$ between the fundamental mode and the first higher-order mode group, and a coupling efficiency $\eta_{11\ 11}$ between the first higher-order modes in the first higher-order mode group (step S06a) and further logarithmically transforming the coupling efficiency $\eta_{01\text{-}01}$ and the coupling efficiency $\eta_{11\ 11}$ to calculate a mode-dependent loss and logarithmically transforming the coupling efficiency $\eta_{01\text{-}11}$ to calculate inter-modal crosstalk (step S06b).

The Brillouin gain coefficient acquisition procedure S01 includes performing:

an input step of inputting, to an optical fiber under test, pump light with an optical frequency (wavelength) that enables the pump light to propagate both as fundamental mode light and as first higher-order mode light in an optical fiber which is a same type as the optical fiber under test and in which a connection point does not exist and probe light having an optical frequency shifted by a given frequency ν within a Brillouin frequency shift range with respect to the optical frequency of the pump light so as to counter-propagate with respect to each other;

a probe light transmittance intensity measurement step of measuring transmitted light intensity Pout of the probe light having been Brillouin-amplified by the pump light at one end of the optical fiber under test into which the pump light was input;

a reference transmittance intensity measurement step of canceling input of the pump light and measuring transmitted light intensity Pref of the probe light at the one end of the optical fiber under test into which the pump light was input; and a Brillouin gain coefficient calculation step of calculating a Brillouin gain coefficient unique to the optical fiber under test by using a ratio of the intensity Pout to the intensity Pref.

In this case, optical modes (a fundamental mode or a first higher-order mode) to be input as the pump light and the probe light are to be arbitrary combined. Accordingly, a Brillouin gain coefficient between arbitrary modes can be acquired.

The pump light pulse input procedure S02 includes performing:

a pump light pulse generation step of generating pulsated pump light of an optical frequency (wavelength) that enables the pump light to propagate both as fundamental mode light and as first higher-order mode light in the optical fiber under test; and a pump light pulse input step of inputting the pump light pulse generated in the pump light pulse generation step into one end of the optical fiber under test in either the fundamental mode or the first higher-order mode.

The probe light input procedure S03 includes performing:

a probe light generation step of generating probe light having an optical frequency shifted by a given frequency ν within a Brillouin frequency shift range with respect to the optical frequency of the pump light; and a probe light input step of inputting the probe light generated in the probe light generation step into the other end of the optical fiber under test in either the fundamental mode or the first higher-order mode.

In this case, the other end of the optical fiber under test refers to an opposite end to the pump light pulse input end.

The measurement procedure S04 includes performing: a mode demultiplexing step of separating fundamental mode and first higher-order mode components included in transmitted light intensity of probe light having been Brillouin-amplified by the pump light pulse at the one end of the optical fiber under test into which the pump light pulse was input in the pump light pulse input procedure S02; and a light intensity acquisition step of photoelectrically converting respective mode components of the Brillouin-amplified probe light separated in the mode demultiplexing step and acquiring an intensity distribution of each of the mode components of the Brillouin-amplified probe light with respect to a distance from the one end of the optical fiber under test into which the pump light pulse was input.

In other words, in the pump light pulse input procedure S02, the probe light input procedure S03, and the measurement procedure S04, Brillouin gain distributions in the fundamental mode and the first higher-order mode of an optical fiber under test 10 are measured using a Brillouin gain analysis method such as that described in NPL 1.

The transmittance acquisition procedure S05 includes performing a transmittance acquisition step of acquiring transmittance occurring in a mode component of the Brillouin-amplified probe light at the connection point of the optical fiber under test by using the intensity distribution of each of the mode components of the Brillouin-amplified probe light acquired in the light intensity acquisition step.

The calculation procedure S06 includes performing:

an inter-modal coupling efficiency calculation step (S06a) of calculating an inter-modal coupling efficiency at the connection point using a mathematical expression or an approximate expression representing transmittance at the connection point that occurs in a Brillouin gain distribution by using the Brillouin gain coefficient calculated in the Brillouin gain coefficient calculation step in the procedure S01 and the transmittance acquired in the transmittance acquisition step in the procedure S05; and a mode-dependent loss and inter-modal crosstalk acquisition step (S06b) of acquiring a mode-dependent loss and inter-modal crosstalk by using the inter-modal coupling efficiency acquired in the inter-modal coupling efficiency calculation step.

Details of calculating the inter-modal coupling efficiency, the mode-dependent loss, and the inter-modal crosstalk will be provided later.

Figure 2:
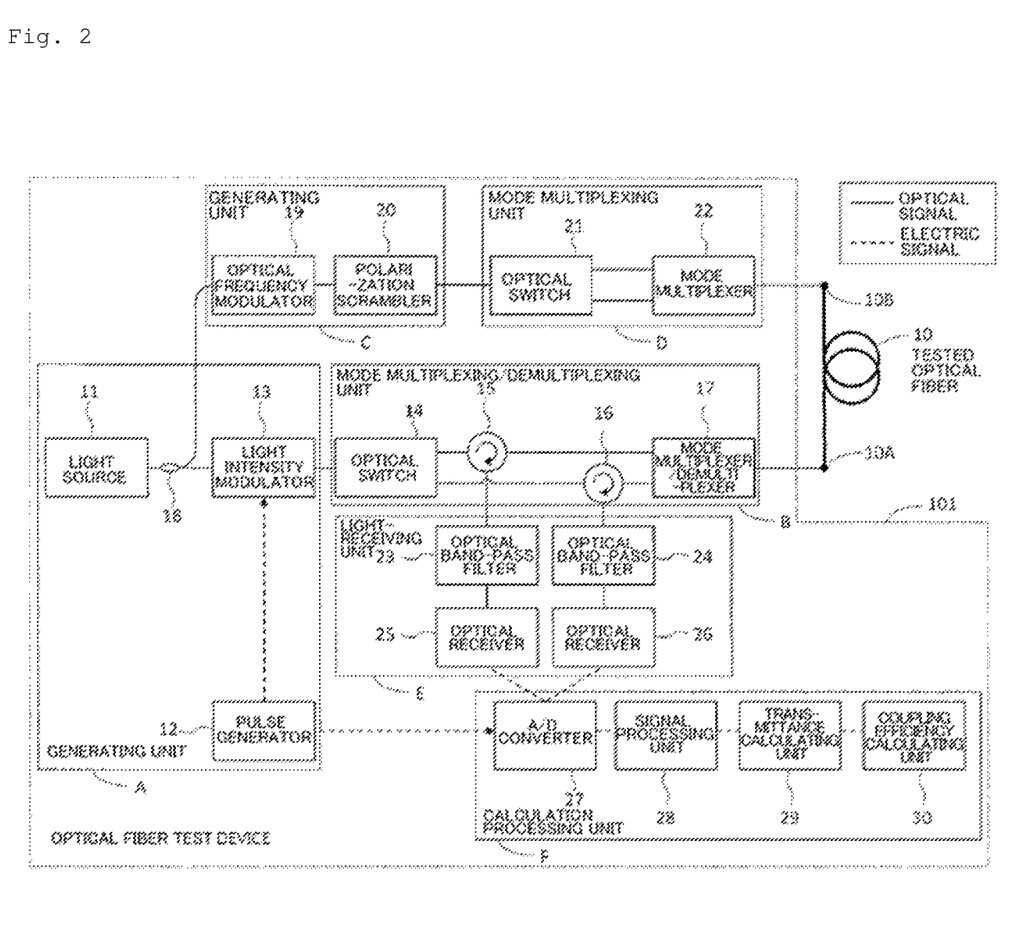
FIG. 2 is a diagram for describing an optical fiber test device according to the present invention.

FIG. 2 is a diagram for describing a configuration example of an optical fiber test device 101 according to the present embodiment. The optical fiber test device 101 includes:

pump light pulse input means which pulsates pump light of an optical frequency (wavelength) that enables the pump light to propagate both as fundamental mode light and as first higher-order mode light and inputs the pulsated pump light into one end 10A of the optical fiber under test 10 constructed by connecting two optical fibers in series in either a fundamental mode or a first higher-order mode;

probe light input means which inputs probe light having an optical frequency shifted by a given frequency v within a Brillouin frequency shift range with respect to the optical frequency of the pump light into the other end 10B of the optical fiber under test in either a fundamental mode or a first higher-order mode;

measurement means which measures a Brillouin gain distribution related to a distance from the one end 10A into which the pump light was input based on transmitted light intensity of the probe light output from an end surface of the one end 10A into which the pump light was input;

transmittance acquisition means which acquires a transmittance at a connection point of the optical fiber under test 10 by using the Brillouin gain distribution measured by the measurement means; and calculation means which substitutes by the Brillouin gain coefficient acquisition means and the transmittance acquired by the transmittance acquisition means into expression (13) to calculate a value ($d^2/w^2$) and substituting the value into expression (10) to expression (12) or expression (14) to expression (19) to calculate a coupling efficiency $\eta_{01\_01}$ between the fundamental modes, a coupling efficiency $\eta_{01\_11}$ between the fundamental mode and the first higher-order mode group, and a coupling efficiency $\eta_{11\_11}$ between the first higher-order modes in the first higher-order mode group (step S06a) and further logarithmically transforms the coupling efficiency $\eta_{01\_01}$ and the coupling efficiency $\eta_{11\_11}$ to calculate a mode-dependent loss and logarithmically transforms the coupling efficiency $\eta_{01\_11}$ to calculate inter-modal crosstalk (step S06b).

The pump light pulse input means includes: a generating unit A which generates pulsated pump light of a wavelength that enables the pump light to propagate both as fundamental mode light and as first higher-order mode light through the optical fiber under test 10; and a mode multiplexing/demultiplexing unit B which inputs the pump light pulse generated by the generating unit A to the optical fiber under test 10 in either the fundamental mode or the first higher-order mode and which separates transmitted light intensity of the probe light to be described later into the fundamental mode and the first higher-order mode.

The probe light input means includes:

a generating unit C which generates probe light having an optical frequency shifted by a given frequency v within a Brillouin frequency shift range with respect to the optical frequency of the pump light pulse; and a mode multiplexing unit D which inputs the probe light generated by the generating unit C to the optical fiber under test 10 in either the fundamental mode or the first higher-order mode.

The measurement means includes:

a mode multiplexing/demultiplexing unit B which separates the probe light having been Brillouin-amplified by the pump light pulse into a fundamental mode component and a first higher-order mode component;

a light-receiving unit E which photoelectrically converts each of the mode components of the Brillouin-amplified probe light separated by the mode multiplexing/demultiplexing unit B; and a signal processing unit 28 which acquires each of the mode components of the Brillouin gain distribution with respect to a distance from the one end 10A of the optical fiber under test 10 based on an output signal of the light-receiving unit E converted into digital data in a calculation processing unit F.

The transmittance acquisition means includes a transmittance calculating unit 29 which calculates transmittance occurring at the connection point by using each of the mode components of the Brillouin gain distribution in the calculation processing unit F.

The calculation means includes a coupling efficiency calculating unit 30 which calculates a coupling efficiency, a mode-dependent loss, and inter-modal crosstalk between the fundamental mode and the first higher-order mode group by using the transmittance in the calculation processing unit F.

The generating unit A includes a light source 11, a pulse generator 12, and a light intensity modulator 13. The light source 11 is capable of outputting continuous light of a wavelength that enables the continuous light to propagate through the optical fiber under test 10 in the fundamental mode and the first higher-order mode, and the output continuous light is pulsated by the light intensity modulator 13 in accordance with a signal from the pulse generator 12 and becomes a pump light pulse. The light intensity modulator 13 is, for example, an acoustic optical modulator provided with an acoustic optical switch configured to pulse-drive an acoustic optical element. The pulse generator 12 may be configured to output a trigger signal for determining a timing to start measurement of a back-scattered light intensity distribution with respect to the calculation processing unit F.

The mode multiplexing/demultiplexing unit B includes an optical switch 14, an optical circulator 15, an optical circulator 16, and a mode multiplexer/demultiplexer 17. The pump light pulse generated by the light intensity modulator 13 is input to the mode multiplexer/demultiplexer 17 via the optical switch 14 and the optical circulator 15 or the optical circulator 16. The mode multiplexer/demultiplexer 17 is, for example, a mode multiplexer/demultiplexer including a directional coupler constituted by a planar lightwave circuit such as that described in NPL 2 or a mode multiplexer/demultiplexer including a phase plate and a free space optical system such as that described in NPL 3. The pump light pulse is input from the mode multiplexer/demultiplexer 17 to the one end 10A of the optical fiber under test 10 in either the fundamental mode or the first higher-order mode. The optical switch 14 can be used to select a mode to be input to the optical fiber under test 10. Instead of using the optical switch 14, a similar function may be realized by manually changing a connection of optical fibers.

The generating unit C includes an optical frequency modulator 19 and a polarization scrambler 20. Light obtained by branching light output from the light source 11 using an optical coupler 18 is shifted by a given frequency v within a Brillouin frequency shift range by the optical frequency modulator 19 and subsequently input to the polarization scrambler 20 to generate probe light. Since the purpose of the optical frequency modulator 19 is to impart an optical frequency difference between the pump light and the probe light, the optical frequency modulator 19 may be installed on an optical path on a pump light-side. In addition, a second light source that outputs a different optical frequency may be used instead of using the optical coupler 18 and the optical frequency modulator 19.

Since a generation efficiency of Brillouin gain is dependent on a matching state of a polarization plane when the pump light and the probe light collide with each other, the matching state of the polarization plane changes depending on a position of an optical fiber to be measured and the gain generation efficiency fluctuates in a longitudinal direction unless the polarization scrambler 20 is used. Using the polarization scrambler 20 enables intensity fluctuations of the Brillouin gain distribution due to a fluctuation in the gain generation efficiency to be reduced. Therefore, when measuring polarization dependence of a loss or crosstalk to be finally acquired, the polarization scrambler 20 may be excluded from constituent elements.

In addition, a light intensity modulator may be used to pulsate the probe light. Pulsating the probe light and controlling a timing of pulsating enables interference between the pump light and the probe light to occur only at a desired position in a fiber. Furthermore, an effect of multiple reflections (which may pose a problem when using continuous light) can also be reduced.

The mode multiplexing unit D includes an optical switch 21 and a mode multiplexer 22. The probe light generated by the generating unit C is input to the mode multiplexer 22 via the optical switch 21. For example, the mode multiplexer 22 is a mode multiplexer/demultiplexer including a directional coupler constituted by a planar lightwave circuit such as that described in NPL 2 or a mode multiplexer/demultiplexer including a phase plate and a free space optical system such as that described in NPL 3. The optical switch 21 can be used to select a mode of the probe light to be input to the optical fiber under test 10. For example, the optical switch 21 is capable of switching between ports to output the probe light and selecting a probe light input port to the mode multiplexer/demultiplexer 22. Accordingly, the probe light is input in either the fundamental mode or the first higher-order mode from the mode multiplexer 22 to an opposite end to the pump light pulse input end of the optical fiber under test 10.

When the pump light pulse and the probe light counter-propagate through the optical fiber under test 10, the probe light is amplified or attenuated by the pump light pulse via stimulated Brillouin scattering (hereinafter, a case where the probe light is amplified will be described as an example). The Brillouin-amplified probe light is input to the mode multiplexer/demultiplexer 17. At this point, the fundamental mode component and the first higher-order mode component included in the Brillouin-amplified probe light are separated by the mode multiplexer/demultiplexer 17.

The light-receiving unit E includes two optical band-pass filters (23 and 24) and two optical receivers (25 and 26). Among the probe light separated into respective mode components by the mode multiplexer/demultiplexer 17, the fundamental mode component is input to the optical receiver 25 via the optical circulator 15 and the optical band-pass filter 23 to be photoelectrically converted. In addition, the first higher-order mode component is input to the optical receiver 26 via the optical circulator 16 and the optical band-pass filter 24 to be photoelectrically converted. In this case, the optical band-pass filters 23 and 24 transmit an optical frequency of the probe light and block an optical frequency of the pump light pulse. In other words, the optical band-pass filters 23 and 24 can be used to block a Fresnel reflection and back-scattered light that are created when inputting the pump light pulse to the optical fiber under test 10.

The calculation processing unit F includes an A/D (analog/digital) converter 27, the signal processing unit 28, the transmittance calculating unit 29, and the inter-modal coupling efficiency calculating unit 30. Electrical signals from the optical receivers 25 and 26 are converted into digital data by the A/D converter 27. The digital data is input to the signal processing unit 28.

The signal processing unit 28 acquires a Brillouin gain distribution by using each mode component of the Brillouin-amplified probe light. Furthermore, the transmittance calculating unit 29 acquires transmittance at the connection point by using the Brillouin gain distributions acquired by the signal processing unit 28. In addition, the coupling efficiency calculating unit 30 performs calculation processing of calculating an inter-modal coupling efficiency, a loss for each mode, and inter-modal crosstalk at the connection point.

It should be noted that the calculation processing unit D can also be realized by a computer and a program, and the program can be either recorded on a recording medium or provided through a network.

Hereinafter, calculation processing of calculating the inter-modal coupling efficiency, the mode-dependent loss, and the inter-modal crosstalk will be described.

Figure 3:
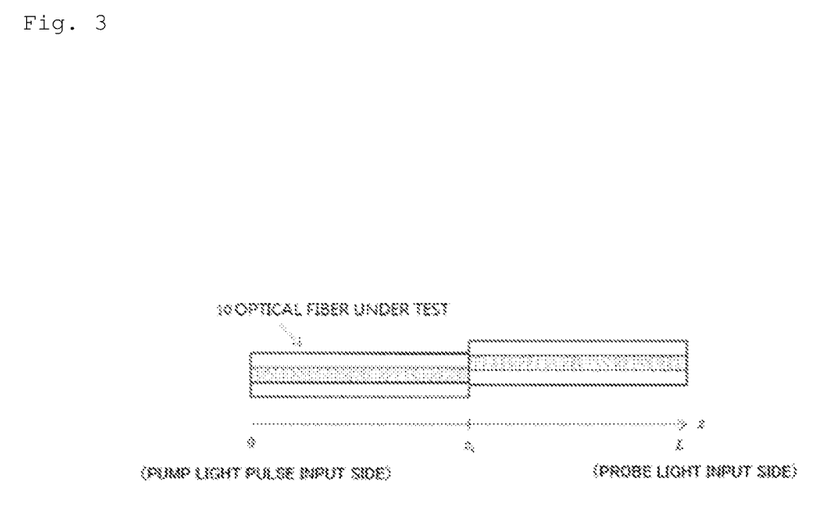
FIG. 3 is a diagram for describing an optical fiber under test.

Let us consider an optical fiber under test with a total length L and having one connection point such as that shown in FIG. 3. In the optical fiber under test 10, a distance from an end on a side into which a pump light pulse is to be input will be represented by z. In addition, a position of the connection point is assumed to be $z_1$.

In this case, an inter-modal coupling efficiency at the connection point is defined as $n_{ij}$. Subscripts i and j (i, j=1, 2) signify propagation modes, where "1" represents a fundamental mode (LP01 mode) and "2" represents a first higher-order mode (LP11 mode). Specifically, $\eta_{11}$ represents a coupling efficiency between the fundamental modes, $\eta_{12}$ and $\eta_{21}$ represent coupling efficiencies between the fundamental mode and the first higher-order mode, and $\eta_{22}$ represents a coupling efficiency between the first higher-order modes. In addition, loss coefficients of the fundamental mode and the first higher-order mode in the optical fiber under test 10 are considered equal to each other and are to be represented by a.

A case will be considered in which pump light is input in a mode i in the pump light pulse input procedure S02 and probe light is input in a mode j in the probe light input procedure S03. When input light intensities of the pump light and the probe light are respectively represented by $P_{p(i)}$ and $P_{s(j)}$, light intensities $P_p(z)$ and $P_s(z)$ of the pump light and the probe light at the position z can be represented by the following expressions.

[Math. 1]
$$P_p(z) = \begin{cases} P_p \exp(-\alpha z) & (z \leq z_1) \\ P_p(\eta_{ii} + \eta_{ii'}) \exp(-\alpha z) & (z \geq z_1) \end{cases} \quad (1)$$

[Math. 2]
$$P_s(z) = \begin{cases} P_{s(j)}(\eta_{jj} + \eta_{jj'}) \exp[-\alpha(L-z)] & (z \leq z_1) \\ P_{s(j)} \exp[-\alpha(L-z)] & (z \geq z_1) \end{cases} \quad (2)$$

It is assumed that i'=2 when i=1 and i'=1 when i=2. A similar convention to i' applies to j'.

When the pump light pulse and the probe light counter-propagate, the probe light is Brillouin-amplified by the pump light pulse via stimulated Brillouin scattering. A light intensity increase amount $\Delta P_s(z)$ when the probe light Brillouin-amplified at the position z reaches the pump light pulse input end can be expressed by the following expression.

[Math. 3]
$$\Delta P_s(z, v) = \begin{cases} [g_{ij}(v)\eta + g_{ij'}(v)\eta_{jj'}]P_{s(j)}P_{p(i)}\exp(-\alpha L)\exp(-\alpha z) & (z \leq z_1) \\ (\eta_{jj} + \eta_{jj'})[g_{ij}(v)\eta_{ii} + g_{i'j}(v)\eta_{ii'}]P_{s(j)}P_i & (z \geq z_1), \\ \exp(-\alpha L)\exp(-\alpha z) \end{cases} \quad (3)$$

where $v$ represents a difference between optical frequencies of the pump light and the probe light, and $g_{ij}$ represents a Brillouin gain coefficient between the pump light in the mode i and the probe light in the mode j.

Next, when considering a case where the fundamental mode component and the first higher-order mode component in the light intensity increase amount $\Delta P_s(z)$ is separated and individually measured in the measurement procedure S04, light intensity increase amounts $\Delta P_{sj}(z)$ and $\Delta P_{sj'}(z)$ that are respectively obtained from the mode j component and the mode j' component can be represented by the following expressions.

[Math. 4]
$$\Delta P_{sj}(z, v) = \begin{cases} g_{ij}(v)\eta_{jj}P_{s(j)}P_{p(i)}\exp(-\alpha L)\exp(-\alpha z) & (z \leq z_1) \\ \eta_{jj}[g_{ij}(v)\eta_{ii} + g_{i'j}(v)\eta_{ii'}]P_{s(j)}P_{p(i)} & (z \geq z_1) \\ \exp(-\alpha L)\exp(-\alpha z) \end{cases} \quad (4)$$

[Math. 5]
$$\Delta P_{sj'}(z, v) = \begin{cases} g_{ij'}(v)\eta_{jj'}P_{s(j)}P_{p(i)}\exp(-\alpha L)\exp(-\alpha z) & (z \leq z_1) \\ \eta_{jj'}[g_{ij}(v)\eta_{ii} + g_{i'j}(v)\eta_{ii'}]P_{s(j)}P_{p(i)} & (z \geq z_1) \\ \exp(-\alpha L)\exp(-\alpha z) \end{cases} \quad (5)$$

Next, in the transmittance acquisition procedure S05, when considering calculating transmittance at the connection point by using each mode component, transmittances $T_j$ and $T_{j'}$ that are respectively obtained from the mode j component and the mode j' component when inputting the probe light in the mode j can be represented by the following expressions.

[Math. 6]
$$T_j = \eta_{ii} + \frac{g_{i'j}(v)}{g_{ij}(v)}\eta_{ii'} \quad (6)$$

[Math. 7]
$$T_{j'} = \frac{g_{ij}(v)\eta_{ii} + g_{i,j}(v)\eta_{ii'}}{g_{ij'}(v)} \quad (7)$$

When j=1 and j'=2, expression (6) represents the transmittance at the connection point that occurs in the Brillouin gain distribution of the fundamental mode and expression (7) represents the transmittance at the connection point that occurs in the Brillouin gain distribution of the first higher-order mode. On the other hand, when j=2 and j'=1, expression (6) represents the transmittance at the connection point that occurs in the Brillouin gain distribution of the first higher-order mode and expression (7) represents the transmittance at the connection point that occurs in the Brillouin gain distribution of the fundamental mode.

In the inter-modal coupling efficiency calculation step S06a, the inter-modal coupling efficiency at the connection point is calculated from the transmittances described above. Three inter-modal coupling efficiency calculation methods will be presented below.

[First Inter-Modal Coupling Efficiency Calculation Method]

In expression (6) and expression (7), $T_j$ and $T_{j'}$ are values that can be directly measured in the transmittance acquisition procedure S05. In addition, $g_{ij}(v)$, $g_{i'j}(v)$, and $g_{ij'}(v)$ are values that can be directly measured in the Brillouin gain coefficient acquisition procedure S01. Therefore, substituting these values into expression (6) and expression (7) and simultaneously setting expression (6) and expression (7) enables coupling efficiencies $\eta_{ii}$ and $\eta_{ii'}$ for each desired mode to be calculated.

In addition, by performing the above in each of the cases where the mode in which the pump light pulse is input is the fundamental mode and the first higher-order mode, coupling efficiencies ($\eta_{11}, \eta_{12}, \eta_{21},$ and $\eta_{22}$) for each of all modes can be acquired.

For example, $g_{11}(v)$, $g_{12}(v)$, $g_{21}(v)$, and $g_{22}(v)$ are acquired in the Brillouin gain coefficient acquisition procedure S01. Specifically, $g_{11}(v)$ is calculated by measuring transmitted light intensity Pout and transmitted light intensity Pref of the probe light when the pump light and the probe light are in the fundamental mode, $g_{12}(v)$ is calculated by measuring transmitted light intensity Pout and transmitted light intensity Pref of the probe light when the pump light is in the fundamental mode and the probe light is in the first higher-order mode, $g_{21}(v)$ is calculated by measuring transmitted light intensity Pout and transmitted light intensity Pref of the probe light when the pump light is in the first higher-order mode and the probe light is in the fundamental mode, and $g_{22}(v)$ is calculated by measuring transmitted light intensity Pout and transmitted light intensity Pref of the probe light when the pump light and the probe light are in the first higher-order mode.

In addition, in the measurement procedure S04, the intensity distribution (first intensity distribution) of the probe light in the fundamental mode when the pump light is in the fundamental mode and the intensity distribution (second intensity distribution) of the probe light in the fundamental mode when the pump light is in the first higher-order mode are respectively measured. Accordingly, in the transmittance acquisition procedure S05, transmittance $T_1$ of the fundamental mode component and transmittance $T_2$ of the first higher-order mode component when j=1 can be acquired. In addition, in the calculation procedure S06, the Brillouin gain coefficients $g_{11}(v)$ and $g_{21}(v)$ and the transmittance $T_1$ are substituted into expression (6) and the Brillouin gain coefficients $g_{11}(v)$, $g_{12}(v)$, and $g_{21}(v)$ and the transmittance $T_2$ are substituted into expression (7).

On the other hand, in the measurement procedure S04, the intensity distribution (third intensity distribution) of the probe light in the first higher-order mode when the pump light is in the fundamental mode and the intensity distribution (fourth intensity distribution) of the probe light in the first higher-order mode when the pump light is in the first higher-order mode are respectively measured. Accordingly, in the transmittance acquisition procedure S05, transmittance $T_2$ of the first higher-order mode component and transmittance $T_1$ of the fundamental mode component when j=2 can be acquired. In addition, in the calculation procedure S06, the Brillouin gain coefficients $g_{22}(v)$ and $g_{12}(v)$ and the transmittance $T_2$ are substituted into expression (6) and the Brillouin gain coefficients $g_{12}(v)$, $g_{22}(v)$, and $g_{11}(v)$ and the transmittance $T_1$ are substituted into expression (7).

By solving expression (6) and expression (7) when i=1 and j=1 and solving expression (6) and expression (7) when i=1 and j=2, coupling efficiencies $\eta_{11}, \eta_{12}, \eta_{21},$ and $\eta_{22}$ can be acquired.

In addition, while an example of acquiring all of the coupling efficiencies $\eta_{11}$, $\eta_{12}$, $\eta_{21}$, and $\eta_{22}$ has been described, any one or more coupling efficiencies may be obtained. In this case, combinations of i and j to be measured in the measurement procedure S04 may be reduced.

[Second Inter-Modal Coupling Efficiency Calculation Method]

In expression (6), $T_j$ is a value that can be directly measured in the transmittance acquisition procedure S05. In addition, $g_{ij}(\nu)$ and $g_{i'j}(\nu)$ are values that can be directly measured in the Brillouin gain coefficient acquisition procedure S01. Therefore, measuring Brillouin gain coefficients and the values of expression (6) with two different frequency differences $\nu_1$ and $\nu_2$ and simultaneously setting the values enables coupling efficiencies $\eta_{ii}$ and $\eta_{ii'}$ for each desired mode to be calculated.

Considering an example using expression (6), coupling efficiencies $\eta_{ii}$ and $\eta_{ii'}$ for each desired mode can be calculated by the following expression.

[Math. 8]

$$\eta_{ii} = \frac{k(\nu_2)T_j(\nu_1) - k(\nu_1)T_j(\nu_2)}{k(\nu_2) - k(\nu_1)} \quad (8)$$

$$\eta_{ii'} = \frac{T_j(\nu_1) - T_j(\nu_2)}{k(\nu_1) - k(\nu_2)}, \quad (9)$$

where $k(\nu)$ represents $g_{i'j}(\nu)/g_{ij}(\nu)$.

For example, Brillouin gain coefficients $g_{11}(\nu)$ and $g_{21}(\nu)$ are acquired in the Brillouin gain coefficient acquisition procedure S01. A specific acquisition method is similar to the first inter-modal coupling efficiency calculation method.

In addition, in the measurement procedure S04, the intensity distribution (first intensity distribution) of the probe light in the fundamental mode when the pump light is in the fundamental mode is measured with the frequency differences $\nu_1$ and $\nu_2$. Accordingly, in the transmittance acquisition procedure S05, transmittances $T_1(\nu_1)$ and $T_1(\nu_2)$ when j=1 can be acquired. At this point, instead of the first intensity distribution, the transmittances $T_1(\nu_1)$ and $T_1(\nu_2)$ can be acquired by measuring the intensity distribution (second intensity distribution) of the probe light in the fundamental mode when the pump light is in the first higher-order mode with the frequency differences $\nu_1$ and $\nabla_2$.

In the calculation procedure S06, $k(\nu)=g_{21}(\nu)/g_{11}(\nu)$, $T_1(\nu_1)$, and $T_1(\nu_2)$ are substituted into expression (8) and expression (9). Accordingly, coupling efficiencies $\eta_{11}$ and $\eta_{12}$ can be acquired. In addition, $k(\nu)=g_{11}(\nu)/g_{21}(\nu)$, $T_1(\nu_1)$, and $T_1(\nu_2)$ are substituted into expression (8) and expression (9). Accordingly, coupling efficiencies $\eta_{22}$ and $\eta_{21}$ can be acquired. Therefore, the coupling efficiencies $\eta_{11}$, $\eta_{12}$, $\eta_{21}$, and $\eta_{22}$ can be acquired.

In this case, the frequency differences $\nu_1$ and $\nu_2$ are frequency differences that correspond to a Brillouin frequency shift amount between the pump light and the probe light. The Brillouin gain coefficient acquisition procedure S01 and the measurement procedure S04 perform measurements with the frequency differences $\nu_1$ and $\nu_2$ by shifting at least any of the probe light and the pump light.

While the example of j=1 has been described, the coupling efficiencies $\eta_{11}$, $\eta_{12}$, $\eta_{21}$, and $\eta_{22}$ can be acquired when j=2 in a similar manner to when j=1. In this case, the Brillouin gain coefficients $g_{12}(\nu)$ and $g_{22}(\nu)$ are acquired in the Brillouin gain coefficient acquisition procedure S01. In the measurement procedure S04, the intensity distribution (third intensity distribution) of the probe light in the first higher-order mode when the pump light is in the fundamental mode or the intensity distribution (fourth intensity distribution) of the probe light in the first higher-order mode when the pump light is in the first higher-order mode are measured with the frequency differences $\nu_1$ and $\nu_2$ to acquire transmittances $T_2(\nu_1)$ and $T_2(\nu_2)$ when j=2.

In addition, while an example using expression (6) has been considered in expression (8) and expression (9), similar processing may be performed using expression (7).

[Third Inter-Modal Coupling Efficiency Calculation Method]

The coupling efficiencies ($\eta_{11}$, $\eta_{12}$, $\eta_{21}$, and $\eta_{22}$) of each mode can also be calculated from only one of expression (6) and expression (7) by using an approximate expression of an inter-modal coupling efficiency when approximating electric field distributions of the fundamental mode and the first higher-order mode in the optical fiber under test 10 as a Gaussian function and a Hermitian Gaussian function.

NPL 4 discloses that when electric field distributions of a fundamental mode and two perpendicular first higher-order modes in an optical fiber are approximated by the following Gaussian function and Hermitian Gaussian function, an inter-modal coupling efficiency at a connection point can be approximated by the following expressions.

[Math. 10]

$$\eta_{11} = \exp\left(-\frac{d^2}{w^2}\right) \quad (10)$$

$$\eta_{12} = \eta_{21} = \frac{d^2}{w^2}\exp\left(-\frac{d^2}{w^2}\right) \quad (11)$$

$$\eta_{22} = \left(1 - \frac{d^2}{w^2} + \frac{1}{2}\frac{d^4}{w^4}\right)\exp\left(-\frac{d^2}{w^2}\right), \quad (12)$$

where w represents a mode field radius of the fundamental mode and the first higher-order modes and d represents an axial deviation amount at the connection point.

From expression (10) to expression (12), inter-modal coupling efficiencies $\eta_{ii}$ and $\eta_{ii'}$ can be represented as functions of "$d^2/w^2$". Therefore, since equations having "$d^2/w^2$" as a sole unknown are obtained by substituting expression (10) to expression (12) into expression (6) or expression (7), a value thereof can be calculated.

For example, when the mode i of the pump light is assumed to be "1 (fundamental mode)" and the mode j of the probe light j is assumed to be "1 (fundamental mode)", the following expression is obtained by substituting expression (10) to expression (12) into expression (6).

[Math. 13]

$$T_1 = \left[1 + \frac{g_{21}(\nu)d^2}{g_{11}(\nu)w^2}\right]\exp\left(-\frac{d^2}{w^2}\right) \quad (13)$$

After substituting $g_{11}$, $g_{21}$, and $T_1$ measured in the Brillouin gain coefficient acquisition procedure S01 and the transmittance acquisition procedure S05 into expression (13), "$d^2/w^2$" can be obtained. Since expression (13) is a nonlinear equation, "$d^2/w^2$" may be obtained by numerical analysis.

For example, $g_{11}(\nu)$ and $g_{21}(\nu)$ are acquired in the Brillouin gain coefficient acquisition procedure S01. In addition, in the measurement procedure S04, the intensity distribution (first intensity distribution) of the probe light in the fundamental mode when the pump light is in the fundamental mode or the intensity distribution (second intensity distribution) of the probe light in the fundamental mode when the pump light is in the first higher-order mode are measured to acquire the transmittance $T_1$. Accordingly, "$d^2/w^2$" is obtained.

Substituting the calculated ($d^2/w^2$) into expression (10) to expression (12) enables an arbitrary inter-modal coupling efficiency to be calculated.

In addition, in a cylindrical optical fiber, the first higher-order mode has two perpendicular spatial modes which strongly couple when propagating through the optical fiber. As a result, an electric field distribution of the first higher-order mode changes during propagation thereof. Accordingly, a loss or inter-modal crosstalk in the first higher-order mode at the connection point may change. NPL 2 discloses approximate expressions of inter-modal coupling efficiencies that take two perpendicular first higher-order modes into consideration. The inter-modal coupling efficiencies can be represented by the following expressions.

[Math. 14]

$$\eta_{11} = \exp\left(-\frac{d^2}{w^2}\right) \quad (14)$$

$$\eta_{12} = \eta_{21} = \frac{d^2}{w^2}\cos^2\theta \cdot \exp\left(-\frac{d^2}{w^2}\right) \quad (15)$$

$$\eta_{13} = \eta_{31} = \frac{d^2}{w^2}\sin^2\theta \cdot \exp\left(-\frac{d^2}{w^2}\right) \quad (16)$$

$$\eta_{22} = \left(1 - \frac{d^2}{w^2}\cos^2\theta\right)^2 \exp\left(-\frac{d^2}{w^2}\right) \quad (17)$$

$$\eta_{23} = \eta_{32} = \left(\frac{d^2}{w^2}\sin\theta\cos\theta\right)^2 \exp\left(-\frac{d^2}{w^2}\right) \quad (18)$$

$$\eta_{33} = \left(1 - \frac{d^2}{w^2}\sin^2\theta\right)^2 \exp\left(-\frac{d^2}{w^2}\right), \quad (19)$$

where θ represents an azimuth within a fiber cross section.

Substituting the calculated ($d^2/w^2$) into expressions (14) to (19) also enables a maximum value and a minimum value that can be assumed by a coupling efficiency corresponding to a loss or inter-modal crosstalk in the first higher-order mode at the connection point to be calculated.

Furthermore, logarithmically transforming the inter-modal coupling efficiency calculated using the method described above enables a loss and inter-modal crosstalk for each mode to be calculated. Specifically, a loss of the fundamental mode can be calculated by logarithmically transforming the coupling efficiency $\eta_{11}$, a loss of the first higher-order mode can be calculated by logarithmically transforming the coupling efficiency $\eta_{22}$, and inter-modal crosstalk can be calculated by logarithmically transforming the coupling efficiency $\eta_{12}$.

The third inter-modal coupling efficiency calculation method is more advantageous than the first and second inter-modal coupling efficiency calculation methods in terms of the following:

Obtaining coupling efficiencies ($\eta_{11}$, $\eta_{12}$, $\eta_{21}$, and $\eta_{22}$) of each of all modes with the first inter-modal coupling efficiency calculation method requires performing a measurement when inputting pump light in each of the fundamental mode and the first higher-order mode. Obtaining coupling efficiencies ($\eta_{11}$, $\eta_{12}$, $\eta_{21}$, and $\eta_{22}$) of each of all modes with the second inter-modal coupling efficiency calculation method requires performing measurements with both frequency differences $v_1$ and $v_2$ although the pump light may be in either the fundamental mode or the first higher-order mode. On the other hand, in the third inter-modal coupling efficiency calculation method, the coupling efficiencies ($\eta_{11}$, $\eta_{12}$, $\eta_{21}$, and $\eta_{22}$) of each of all modes can be obtained from measurement results when inputting pump light in either the fundamental mode or the first higher-order mode. In other words, since the measurement procedure includes fewer steps, there is an advantage that measurement time can be reduced.

In the second and third inter-modal coupling efficiency calculation methods, since only measuring any one of expression (6) and expression (7) may suffice, a part of the constituent elements can be reduced. For example, the optical circulator 16, the optical band-pass filter 24, and the optical receiver 26 may be removed from the constituent elements.

In the second and third inter-modal coupling efficiency calculation methods, since only measuring any one of expression (6) and expression (7) will suffice, the number of Brillouin gain coefficients necessary for calculating an inter-modal coupling efficiency can be reduced. In other words, since it is no longer necessary to measure Brillouin gain coefficients corresponding to all combinations of modes in the Brillouin gain coefficient acquisition procedure S01, measurement time can be reduced.

Other Embodiments

It should be noted that the present invention is not limited to the embodiment described above and various modifications can be made and implemented without departing from the spirit and scope of the present invention. In summary, the present invention should not be limited to a higher-order embodiment and can be implemented by modifying constituent elements without departing from the scope of the invention. For example, the calculation processing unit D can also be realized by a computer and a program, and the program can be either recorded on a recording medium or provided through a network.

In addition, various inventions can be formed by appropriately combining the plurality of constituent elements disclosed in the embodiment described above. For example, several constituent elements may be deleted from all of the constituent elements described in the embodiment. Furthermore, constituent elements across different embodiments may be appropriately combined.

INDUSTRIAL APPLICABILITY

The present disclosure is applicable to the information communication industry.

REFERENCE SIGNS LIST

10 Optical fiber under test
11 Light source
12 Pulse generator
13 Light intensity modulator
14 Optical switch
15, 16 Optical circulator 17 Mode multiplexer/demultiplexer
18 Optical coupler
19 Optical frequency modulator
20 Polarization scrambler
21 Optical switch
22 Mode multiplexer
23, 24 Optical band-pass filter
25, 26 Optical receiver
27 A/D converter
28 Signal processing unit
29 Transmittance calculating unit
30 Coupling efficiency calculating unit
101 Optical fiber test device

The invention claimed is:

1. An optical fiber test method, comprising performing:
a Brillouin gain coefficient acquisition procedure of acquiring a Brillouin gain coefficient that is unique to an optical fiber under test;
a pump light pulse input procedure of pulsating pump light of an optical frequency that enables the pump light to propagate both as fundamental mode light and as first higher-order mode light and inputting the pulsated pump light into one end of the optical fiber under test constructed by connecting two optical fibers in series in either a fundamental mode or a first higher-order mode;
a probe light input procedure of inputting probe light having an optical frequency shifted by a given frequency v within a Brillouin frequency shift range with respect to the optical frequency of the pump light into the other end of the optical fiber under test in either a fundamental mode or a first higher-order mode;
a measurement procedure of measuring a Brillouin gain distribution related to a distance from the one end into which the pump light was input based on transmitted light intensity of the probe light output from an end surface into which the pump light was input;
a transmittance acquisition procedure of acquiring a transmittance of the probe light at a connection point of the optical fiber under test by using the Brillouin gain distribution measured in the measurement procedure; and
a calculation procedure of substituting the acquired Brillouin gain coefficient and the acquired transmittance into a first mathematical expression representing a transmittance at the connection point that occurs in a Brillouin gain distribution in a fundamental mode and a second mathematical expression representing a transmittance at the connection point that occurs in a Brillouin gain distribution in a first higher-order mode according to each mode and simultaneously setting the first and second mathematical expressions to calculate at least one of a coupling efficiency between the fundamental modes, a coupling efficiency between the fundamental and first higher-order modes, or a coupling efficiency between the first higher-order modes.

2. The optical fiber test method according to claim 1, wherein any one of expression (C1) and expression (C2) below is used as the first mathematical expression and the other is used as the second mathematical expression;

[Math. C1]

$$T_i = \eta_{ii} + \frac{g_{i'j}(v)}{g_{ij}(v)} \eta_{ii'} \quad (C1)$$

$$T_{j'} = \frac{g_{ij}(v)\eta_{ii} + g_{i'j}(v)\eta_{ii'}}{g_{ij'}(v)} \quad (C2)$$

where $T_j$ represents a transmittance obtained from a mode j component.

3. The optical fiber test method according to claim 1, wherein
the calculation procedure further includes
logarithmically transforming the coupling efficiency between the fundamental modes and the coupling efficiency between the first higher-order modes to calculate a loss for each mode, and
logarithmically transforming the coupling efficiency between the fundamental mode and the first higher-order mode to calculate inter-modal crosstalk.

4. An optical fiber test method, comprising performing:
a Brillouin gain coefficient acquisition procedure of acquiring a Brillouin gain coefficient that is unique to an optical fiber under test;
a pump light pulse input procedure of pulsating pump light of an optical frequency that enables the pump light to propagate both as a fundamental mode light and as first higher-order mode light and inputting the pulsated pump light into one end of the optical fiber under test constructed by connecting two optical fibers in series in either a fundamental mode or a first higher-order mode;
a probe light input procedure of inputting probe light having an optical frequency shifted by a given frequency v within a Brillouin frequency shift range with respect to the optical frequency of the pump light into the other end of the optical fiber under test in either a fundamental mode or a first higher-order mode;
a measurement procedure of measuring a Brillouin gain distribution related to a distance from the one end into which the pump light was input based on transmitted light intensity of the probe light output from an end surface into which the pump light was input;
a transmittance acquisition procedure of acquiring a transmittance of the probe light at a connection point of the optical fiber under test by using the Brillouin gain distribution measured in the measurement procedure; and
a calculation procedure of executing each of the procedures described above using two frequency differences, with respect to each of the frequency differences, substituting the acquired Brillouin gain coefficient and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and simultaneously setting the first or second mathematical expressions to calculate at least one of a coupling efficiency between the fundamental modes, a coupling efficiency between the fundamental and first higher-order modes, or a coupling efficiency between the first higher-order modes.

5. An optical fiber test method, comprising performing:
a Brillouin gain coefficient acquisition procedure of acquiring a Brillouin gain coefficient that is unique to an optical fiber under test;
a pump light pulse input procedure of pulsating pump light of an optical frequency that enables the pump light to propagate both as fundamental mode light and as first higher-order mode light and inputting the pulsated pump light into one end of the optical fiber under test constructed by connecting two optical fibers in series in either a fundamental mode or a first higher-order mode;

a probe light input procedure of inputting probe light having an optical frequency shifted by a given frequency v within a Brillouin frequency shift range with respect to the optical frequency of the pump light into the other end of the optical fiber under test in either a fundamental mode or a first higher-order mode;

a measurement procedure of measuring a Brillouin gain distribution related to a distance from the one end into which the pump light was input based on transmitted light intensity of the probe light output from an end surface into which the pump light was input;

a transmittance acquisition procedure of acquiring a transmittance of the probe light at a connection point of the optical fiber under test by using the Brillouin gain distribution measured in the measurement procedure; and a calculation procedure of substituting the acquired Brillouin gain coefficient and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and further substituting a third mathematical expression obtained by individually approximating an electric field distribution in a fundamental mode or a first higher-order mode in the optical fibers in a mathematical expression for obtaining each inter-modal coupling efficiency at the connection point of the optical fibers based on an electric field distribution of each mode in the optical fibers and an axial deviation amount at the connection point by a Gaussian function and an Hermitian Gaussian function to calculate at least one of a coupling efficiency between the fundamental modes, a coupling efficiency between the fundamental and first higher-order modes, or a coupling efficiency between the first higher-order modes.

6. The optical fiber test method according to claim 5, wherein expression (C3) below is used as the third mathematical expression;

[Math. C3]

$$\eta_{01-01} = \exp\left(-\frac{d^2}{w^2}\right)$$

$$\eta_{01-11} = \eta_{11-01} = \frac{d^2}{w^2}\exp\left(-\frac{d^2}{w^2}\right)$$

$$\eta_{11-11} = \left(1 - \frac{d^2}{w^2} + \frac{1}{2}\frac{d^4}{w^4}\right)\exp\left(-\frac{d^2}{w^2}\right),$$

(C3)

where w represents a mode field radius of the fundamental mode and the first higher-order modes in the optical fiber under test, d represents the axial deviation amount, $\eta_{01-01}$ represents the coupling efficiency between the fundamental modes, $\eta_{01-11}$ represents the coupling efficiency between the fundamental mode and the first higher-order mode group, and $\eta_{11-11}$ represents the coupling efficiency between the first higher-order modes in the first higher-order mode group.

7. An optical fiber test device, comprising:

pump light pulse input means which pulsates pump light of an optical frequency that enables the pump light to propagate both as fundamental mode light and as first higher-order mode light and inputs the pulsated pump light into one end of an optical fiber under test constructed by connecting two optical fibers in series in either a fundamental mode or a first higher-order mode;

probe light input means which inputs probe light having an optical frequency shifted by a given frequency v within a Brillouin frequency shift range with respect to the optical frequency of the pump light into the other end of the optical fiber under test in either a fundamental mode or a first higher-order mode;

measurement means which measures a Brillouin gain distribution related to a distance from the one end into which the pump light was input based on transmitted light intensity of the probe light output from an end surface into which the pump light was input;

transmittance acquisition means which acquires a transmittance of the probe light at a connection point of the optical fiber under test by using the Brillouin gain distribution measured by the measurement means; and calculation means which substitutes a Brillouin gain coefficient unique to the optical fiber under test and the acquired transmittance into a first mathematical expression representing a transmittance at the connection point that occurs in a Brillouin gain distribution in a fundamental mode and a second mathematical expression representing a transmittance at the connection point that occurs in a Brillouin gain distribution in a first higher-order mode according to each mode and which simultaneously sets the first and second mathematical expressions to calculate at least one of a coupling efficiency between the fundamental modes, a coupling efficiency between the fundamental and first higher-order modes, or a coupling efficiency between the first higher-order modes.

8. An optical fiber test device, comprising:

pump light pulse input means which pulsates pump light of an optical frequency that enables the pump light to propagate both as fundamental mode light and as first higher-order mode light and inputs the pulsated pump light into one end of an optical fiber under test constructed by connecting two optical fibers in series in either a fundamental mode or a first higher-order mode;

probe light input means which inputs probe light having an optical frequency shifted by a given frequency v within a Brillouin frequency shift range with respect to the optical frequency of the pump light into the other end of the optical fiber under test in either a fundamental mode or a first higher-order mode;

measurement means which measures a Brillouin gain distribution related to a distance from the one end into which the pump light was input based on transmitted light intensity of the probe light output from an end surface into which the pump light was input;

transmittance acquisition means which acquires a transmittance of the probe light at a connection point of the optical fiber under test by using the Brillouin gain distribution measured by the measurement means; and calculation means which, with respect to two different frequency differences, substitutes a Brillouin gain coefficient unique to the optical fiber under test and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and which simultaneously sets the first or second mathematical expressions to calculate at least one of a coupling efficiency between the fundamental modes, a coupling efficiency between the fundamental and first higher-order modes, or a coupling efficiency between the first higher-order modes.

9. An optical fiber test device, comprising:
pump light pulse input means which pulsates pump light of an optical frequency that enables the pump light to propagate both as fundamental mode light and as first higher-order mode light and inputs the pulsated pump light into one end of an optical fiber under test constructed by connecting two optical fibers in series in either a fundamental mode or a first higher-order mode;
probe light input means which inputs probe light having an optical frequency shifted by a given frequency v within a Brillouin frequency shift range with respect to the optical frequency of the pump light into the other end of the optical fiber under test in either a fundamental mode or a first higher-order mode;
a measurement means which measures a Brillouin gain distribution related to a distance from the one end into which the pump light was input based on transmitted light intensity of the probe light output from an end surface into which the pump light was input;
transmittance acquisition means which acquires a transmittance of the probe light at a connection point of the optical fiber under test by using the Brillouin gain distribution measured by the measurement means; and
calculation means which substitutes a Brillouin gain coefficient unique to the optical fiber under test and the acquired transmittance into a first mathematical expression representing a transmittance at the connection point that occurs in a Brillouin gain distribution in a fundamental mode or a second mathematical expression representing a transmittance at the connection point that occurs in a Brillouin gain distribution in a first higher-order mode and which further substitutes a third mathematical expression obtained by individually approximating an electric field distribution in a fundamental mode or a first higher-order mode in the optical fibers in a mathematical expression for obtaining each inter-modal coupling efficiency at the connection point of the optical fibers based on an electric field distribution of each mode in the optical fibers and an axial deviation amount at the connection point by a Gaussian function and an Hermitian Gaussian function to calculate at least one of a coupling efficiency between the fundamental modes, a coupling efficiency between the fundamental and first higher-order modes, or a coupling efficiency between the first higher-order modes.

* * * * *